B. BUTLER.
Harrow and Planter.
No. 159,073. Patented Jan. 26, 1875.
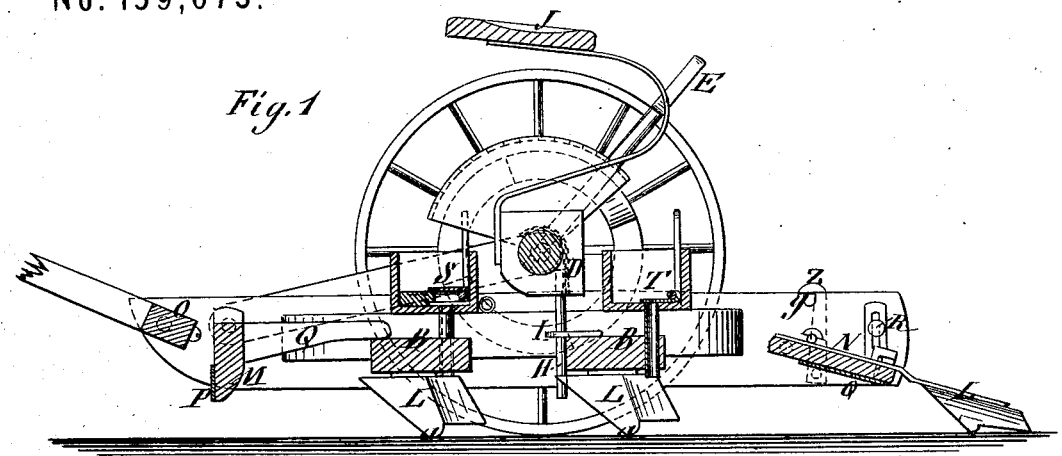
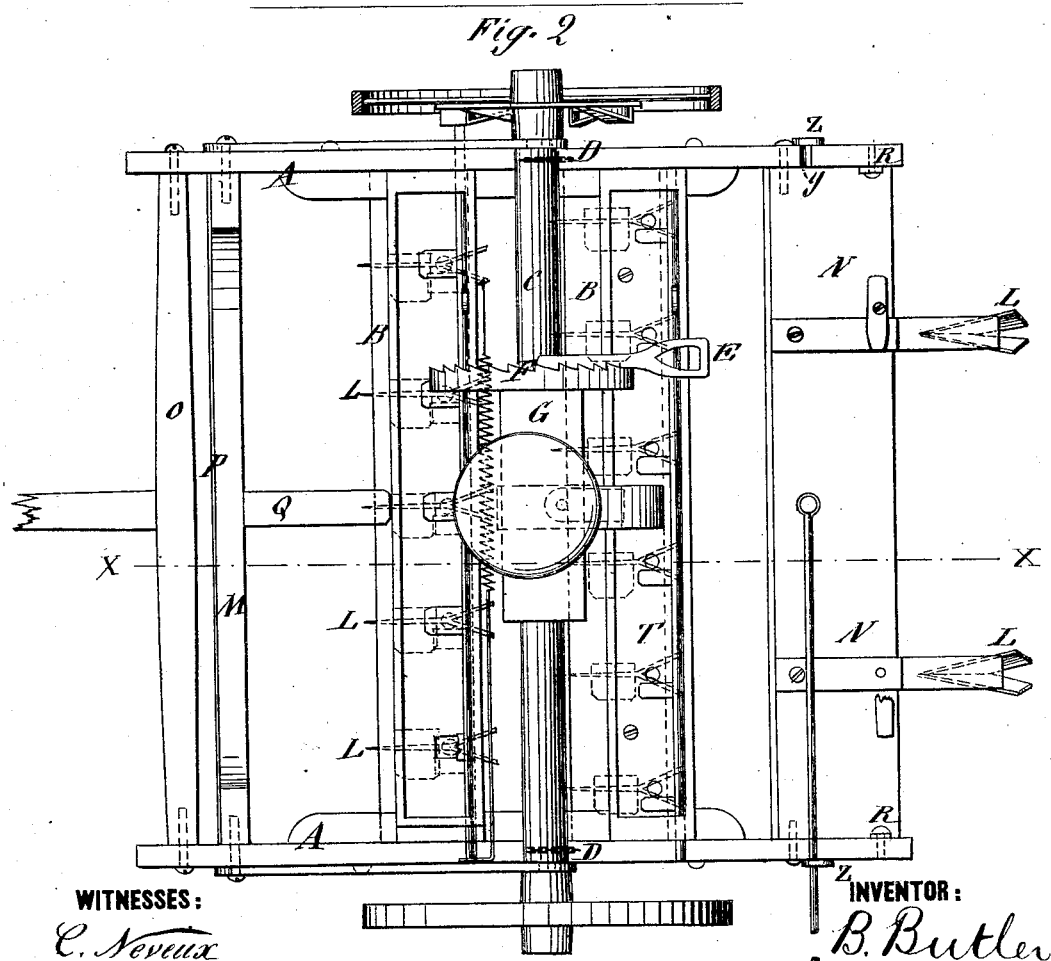
WITNESSES:
C. Neveux
A. F. Terry
INVENTOR:
B. Butler
BY
ATTORNEYS.

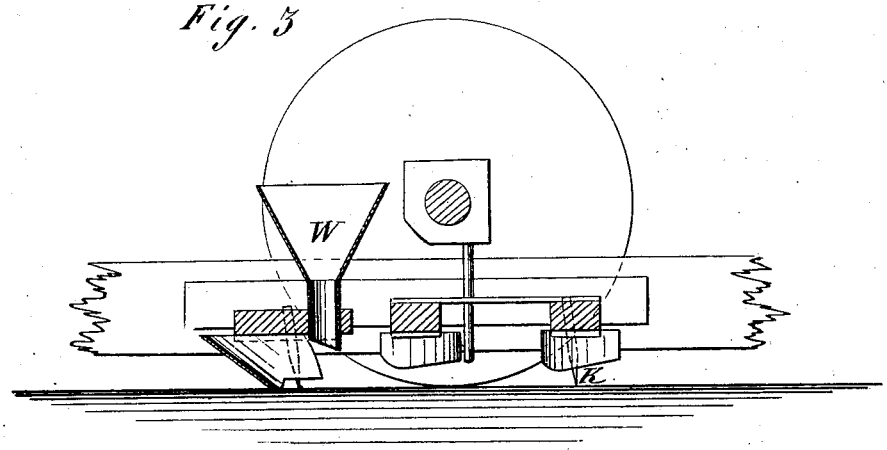
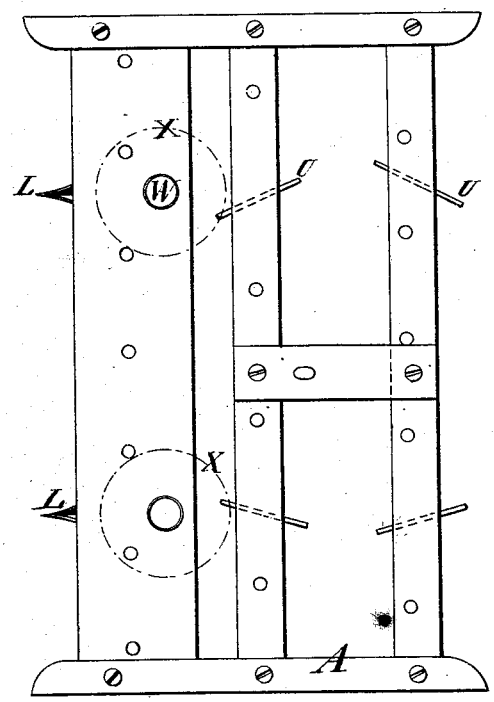
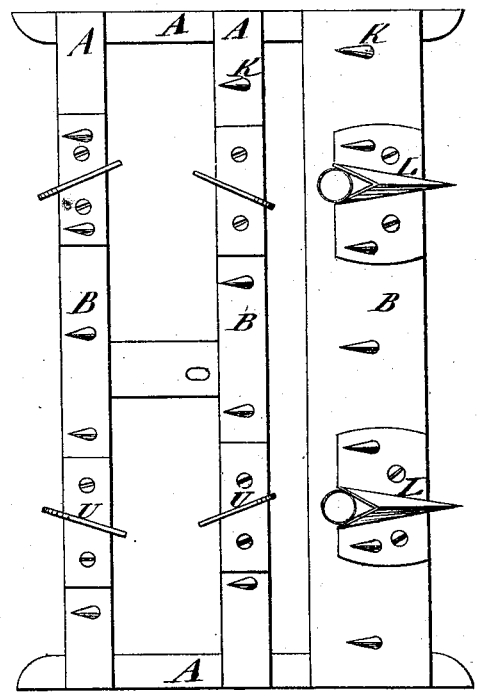
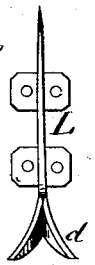
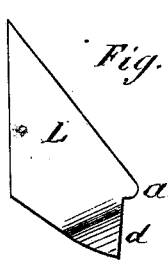

UNITED STATES PATENT OFFICE.

BEAUMAN BUTLER, OF ST. JOHNSBURY CENTRE, VERMONT.

IMPROVEMENT IN HARROWS AND PLANTERS.

Specification forming part of Letters Patent No. 159,073, dated January 26, 1875; application filed October 31, 1874.

*To all whom it may concern:*

Be it known that I, BEAUMAN BUTLER, of St. Johnsbury Centre, in the county of Caledonia and State of Vermont, have invented a new and Improved Harrow and Planter, of which the following is a specification:

My invention relates to a harrow and planter; and it consists of certain improved contrivances of cultivating and drilling teeth, also covering-scrapers and smoothing-scrapers, and dropping apparatus, and in certain arrangements of the harrow and truck, all as hereinafter described.

Figure 1 is a longitudinal sectional elevation of my improved harrow and planter. Fig. 2 is a plan view. Fig. 3 is a sectional elevation, showing a modification adapted for planting potatoes. Fig. 4 is a plan of the modified arrangement of Fig. 3. Fig. 5 is a plan of the same arrangement inverted. Figs. 6 and 7 are top and side elevations of the teeth, such as I propose to use for cultivating and planting.

Similar letters of reference indicate corresponding parts.

A represents runner-shaped planks, forming the sides of the frame. They are connected together by cross-pieces B, and suspended from the truck-axle C by chains D, to be raised and lowered to regulate the depth of the teeth in the earth, also to lift the teeth entirely above the ground when the machine is to be transported to and from the field. The axle is turned by a hand-lever, E, and held by the ratchet F, which is attached to the block G on the axle which turns in it, the block being prevented from turning by the rod H, which projects down through a plate or bar, I, attached to one of the cross-pieces of the frame. This block G also supports the seat J. The cross-bars B are armed with harrow-teeth K, and cultivator or drill-teeth L, or the latter only according to the kind of work to be done. Besides the cross-bars B, of which there may be two or more, there are also scraper-bars M and N, and the tongue-roller O extending across from one to the other of the runners. The front scraper is arranged vertically on pivots, and is armed with a metal plate, P, at the front. There is also a foot-lever, Q, extending backward and resting on the first cross-bar, to be pressed down by the driver to hold the scraper to its work, its office being to crush the clods, and otherwise smooth the surface in advance of the teeth. The scraper M may, however, be used in rear of the harrow-teeth, and provided with a suitably-arranged lever for operating it. The hind scraper is a broad plank, armed with a metal plate, Q, and arranged oblique to the surface, the front edge being the highest to run over and press down the lumps smoothly. It is also arranged on pivots at the upper edge to adjust the bearing portion higher or lower, as required, and it is provided with adjusting-holders R. This scraper also carries a couple of drill or cultivator teeth, as shown in Figs. 1 and 2, when it may be preferred to subsequently plant by hand or otherwise; but these will not be used when the planter is attached to the harrow, which will generally be the case.

The marking-rod and teeth or small plows L may, in some cases, be attached to other parts of the machine than those above specified when it is desirable not to use the scraper N.

For sowing wheat and other grains the harrow-teeth K will not be used, and the drill or cultivator teeth will be arranged in two rows, as in Figs. 1 and 2, with the grain-dropping apparatus S over the front row. The teeth of the hind row will be arranged between those of the front row to cultivate the earth between the drills receiving the grain, and at the same time assist in covering; but grain may be dropped with both sets of teeth. The hind row may also have corn-dropping apparatus T, and thus the machine will be adapted for sowing small grains, and also planting corn.

I also propose to employ two reversely-inclined plane-scrapers, V, behind the drills, for covering any kind of grain, the scrapers being placed a little distance apart in a line behind the drills. By this arrangement there will be no clogging of the covering-scrapers as when they are placed side by side. This arrangement of scrapers will be particularly useful for covering potatoes, and I propose to use them in connection with tubes W for the dropping of the potatoes by hand, and in practice the tubes will have a hopper in connection, as indicated by the dotted lines X, or in any approved arrangement, in which to carry the potatoes conveniently for taking them up to drop in this manner.

Y is a marking-rod, to be used for marking a line to guide the driver by the last row planted, to aid in marking the rows parallel. It is pivoted to the frame at the middle, and swings around to change from side to side as the machine turns, and it drops into notches Y in the runners, where it is held by hooks Z. This marker will, in practice, be made of two extensible parts to adapt it for wide or narrow rows.

Having thus described my invention, I claim as new and desire to secure by Letters Patent—

1. The combination, in a seeder, of the teeth K, openers L, scraper-bars M N, and tongue-roller O, arranged, as shown and described, to bring the land into good tilth.

2. A seed-harrow, having the teeth K L and the reversely-obliqued covering-scrapers U, arranged as and for the pourpose specified.

BEAUMAN BUTLER.

Witnesses:
 JOHN BACON,
 W. F. KELLEY.